N. WRIGHT.
Machine for Returning Crank Pins of Locomotives.
No. 99,993. Patented Feb. 15, 1870.
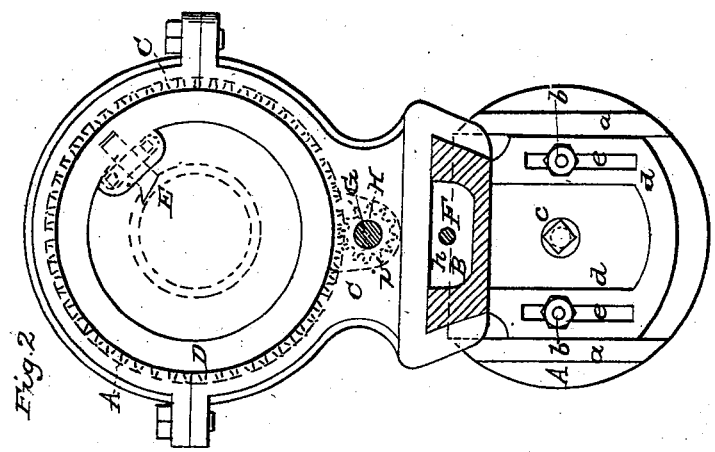
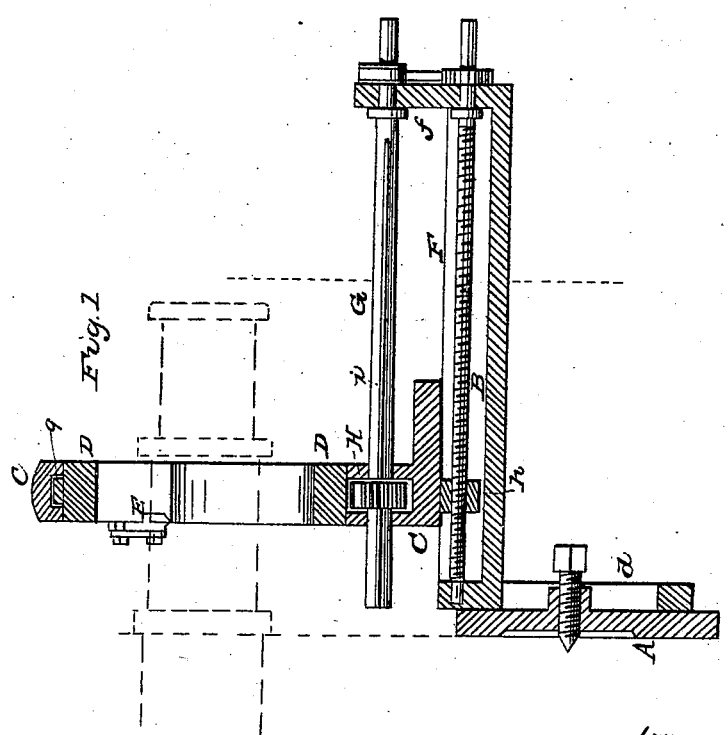

UNITED STATES PATENT OFFICE.

NATHAN WRIGHT, OF CLEVELAND, OHIO.

Letters Patent No. 99,993, dated February 15, 1870.

IMPROVED MACHINE FOR RE-TURNING CRANK-PINS OF LOCOMOTIVES.

The Schedule referred to in these Letters Patent and making part of the same.

*To all whom it may concern:*

Be it known that I, NATHAN WRIGHT, of Cleveland, in the county of Cuyahoga, and State of Ohio, have invented a new and useful Machine for Re-turning Crank-Pins of Locomotive Wheels; and I do hereby declare that the following is a full, clear, and exact description of the same, reference being had to the accompanying drawing forming part of this specification, and in which—

Figure 1 represents a longitudinal vertical section of my invention, showing a portion of a locomotive wheel with the crank-pin in dotted lines.

Figure 2 is a transverse section, as indicated by the dotted line x x in fig. 1.

Similar letters of reference indicate corresponding parts in both figures.

The object of my invention is to re-turn crank-pins on locomotive wheels, when sprung or worn untrue, without taking them off the wheels, which is always a difficult and laborious job; and to this end, It consists in a suitably constructed plate, which can be rigidly fastened and centered to the hub of the wheel. Said plate is to sustain a slide or rest made to be adjustable, upon which a sliding carriage is moved by means of a feed-screw. To this carriage a circular ring-shaped cogged tool-holder is attached, which is operated by a crank secured to a shaft, on which a pinion is mounted, said pinion to gear with the cogs on the tool-holder.

To enable others skilled in the art to construct machines according to my invention, I will proceed to describe the same with reference to the drawing.

A is a plate of a suitable form to fit the face of the hub of a wheel, and of sufficient strength to support the machine. This plate is provided with vertical guides *a a* on its rear surface, near to its borders, and screw-studs *b b*. Through the center of this plate a set-screw, *c*, is passed.

B is a slide or rest, the sides of which are bevel-shaped and its upper surface recessed for nearly its entire length. One end of this rest is provided with a downward-projecting flange, *d*, which has vertical slots *e e* formed on it. The other end is provided with an upright bracket, *f*.

C is a sliding carriage, the base of which is formed to fit the slide or rest B, while its upper portion is made of two parts of circular form, to allow it to come apart in the middle, and has a wide central circular opening. On the inside face of the circular portion of the rest B a groove, *g*, is formed all around. A nut, *h*, is rigidly secured to the under side of the base of the sliding carriage C.

D is a circular ring-shaped tool-holder, which is fitted to turn in the circular opening of the sliding carriage C. Around the middle of its face teeth are formed to constitute a gear, while on its inner surface a boss is provided to receive the turning-tool E, which may be held and adjusted by any suitable means.

G is a feeding screw turning in fixed bearings on the rest B, and passing through the nut *h*.

F is a shaft running parallel with the screw F, and passing through the sliding carriage C, while its fixed bearing is on the rest B. This shaft is provided with a groove, *i*, cut along almost its entire length.

A pinion, H, made to gear with the cogged tool-holder D, is mounted on the shaft G, and made to turn with the same in a recess in the sliding carriage C, by means of a feather on the pinion fitting the groove *i*, on the shaft G, and yet allow the pinion to slide along said shaft.

The operation of this machine is as follows:

The plate A is first firmly secured to the hub of the wheel by means of clamps and screw-bolts passing between the spokes of the wheel, while the set screw *c* serves to bring it to the center of the axle of the wheel. The rest B is then attached to the plate A by means of the studs *b b*, the same passing through the slots *e e* in the flange *d*. After being properly adjusted to the throw of the crank, it is firmly secured to the plate A by means of nuts on the screw-studs *b b*. The turning tool E is then adjusted to the inside collar of the crank-pin, which projects through the opening of the tool-holder, that collar not being liable to wear or spring. The tool E is then set in operation by means of a crank on the end of the shaft G. The feed of the tool-holder is carried on in connecting the feed-screw F with the shaft G by any suitable means.

What is here claimed, and desired to be secured by Letters Patent, is—

The combination of the rotating cogged tool-holder D, carriage C, and slide or rest B, pinion-shaft G and feed-screw F, with the centering plate A, substantially as and for the purpose herein specified.

NATHAN WRIGHT.

Witnesses:
SIDNEY H. SPRULES,
C. F. BEACH.